(12) United States Patent
Dunne

(10) Patent No.: US 10,376,816 B2
(45) Date of Patent: Aug. 13, 2019

(54) SYSTEM AND METHOD FOR SEPARATION OF SUSPENDED SOLIDS FROM WASTE FLUID

(71) Applicant: Innovation Water Clarification Inc., Regina (CA)

(72) Inventor: Patrick Dunne, Regina (CA)

(73) Assignee: Innovation Water Clarification, Inc., Regina, Saskatchewan (CA)

( * ) Notice: Subject to any disclaimer, the term of this patent is extended or adjusted under 35 U.S.C. 154(b) by 0 days.

(21) Appl. No.: 15/566,208

(22) PCT Filed: Apr. 13, 2015

(86) PCT No.: PCT/CA2015/000241
§ 371 (c)(1),
(2) Date: Oct. 12, 2017

(87) PCT Pub. No.: WO2016/165000
PCT Pub. Date: Oct. 20, 2016

(65) Prior Publication Data
US 2018/0111064 A1    Apr. 26, 2018

(51) Int. Cl.
| | | |
|---|---|---|
| *B01D 21/34* | (2006.01) | |
| *B01D 21/02* | (2006.01) | |
| *B01D 21/24* | (2006.01) | |
| *B01D 21/00* | (2006.01) | |
| *B01D 21/01* | (2006.01) | |
| *B01D 21/08* | (2006.01) | |
| *B01D 21/30* | (2006.01) | |

(Continued)

(52) U.S. Cl.
CPC .......... *B01D 21/34* (2013.01); *B01D 21/0018* (2013.01); *B01D 21/0024* (2013.01); *B01D 21/01* (2013.01); *B01D 21/02* (2013.01); *B01D 21/16* (2013.01); *B01D 21/245* (2013.01); *B01D 21/2444* (2013.01); *B01D 21/30* (2013.01); *C02F 1/008* (2013.01); *C02F 1/52* (2013.01); *C02F 2001/007* (2013.01); *C02F 2201/005* (2013.01)

(58) Field of Classification Search
CPC  B01D 21/0018; B01D 21/0024; B01D 21/01; B01D 21/02; B01D 21/2444; B01D 21/245; B01D 21/30; B01D 21/34
USPC ....... 210/741, 800, 803, 137, 202, 519, 521, 210/522, 532.1, 533
See application file for complete search history.

(56) References Cited

U.S. PATENT DOCUMENTS

| | | | | |
|---|---|---|---|---|
| 4,427,551 A | * | 1/1984 | Duveau ................. | B01D 37/00 210/741 |
| 4,898,678 A | * | 2/1990 | Johnson ............ | B01D 21/2444 210/741 |

(Continued)

*Primary Examiner* — Christopher Upton
(74) *Attorney, Agent, or Firm* — Snell & Wilmer, LLP

(57) ABSTRACT

A separation system for the removal of suspended solids from raw fluid. Raw fluid is placed in a non-pressurized settling tank and allowed to partially settle before injection into a pressurized clarification vessel. Following a dwell period clarified fluid is discharged at the top of the clarification vessel and settled waste is removed at the bottom thereof. Constant vessel pressure is maintained during injection of raw fluid or the discharge of clarified fluid or settled waste. The system is simpler to manufacture and more efficacious in its use than prior art methods.

35 Claims, 5 Drawing Sheets

(51) Int. Cl.
*C02F 1/00* (2006.01)
*C02F 1/52* (2006.01)

(56) References Cited

U.S. PATENT DOCUMENTS

| | | | | |
|---|---|---|---|---|
| 5,238,663 | A * | 8/1993 | Vikari | B01D 21/01 |
| | | | | 210/723 |
| 5,904,855 | A * | 5/1999 | Manz | B01D 21/01 |
| | | | | 210/523 |
| 6,607,671 | B2 * | 8/2003 | Vuong | B01D 21/02 |
| | | | | 210/519 |
| 6,902,667 | B1 * | 6/2005 | Dunne | C02F 1/5281 |
| | | | | 210/202 |
| 7,927,490 | B2 * | 4/2011 | Teichroeb | B01D 21/10 |
| | | | | 210/521 |
| 8,795,537 | B2 * | 8/2014 | Van der Merwe | B01D 21/34 |
| | | | | 210/800 |

\* cited by examiner

SYSTEM AND METHOD FOR SEPARATION OF SUSPENDED SOLIDS FROM WASTE FLUID

This invention is in the field of waste water and other similar and various fluid treatment applications, and more specifically provides a method and apparatus for the highly efficient removal of sedimentary or suspended solid waste from raw waste fluids.

BACKGROUND

This invention generally speaking relates to a method and apparatus for the removal of solid matter from water or other fluids, by the introduction of one or more chemicals into the fluid under pressure to coagulate the solid materials. Following coagulation of the solid materials, provided that the raw fluid under pressure is not unduly disturbed, the solid materials will settle out of the fluid for removal, and the clarified fluid can be drawn off the system.

At the present time, most methods of the treatment of waste water or other effluent for the removal of solids contained therein are mainframe biological treatments. These systems are costly and highly inefficient, due in part to any deficiencies created by shock loadings which destroy the biological components of the treatment strain or the like.

Numerous other attempts have been made in the prior art other than mainframe biological treatment systems, to endeavor to produce a fluid treatment system which will compete with the performance of a biological approach, at lower costs. These have typically not been all that successful.

One example of a prior patent in this area was Canadian Patent Serial No. 2267677, entitled "Fluid Treatment System", to the same inventor. That patent was generally speaking directed to a method and apparatus for the removal of suspended solids from water or other effluent similar to the present time—the raw fluid was placed in a pressurized equalization chamber for a first stage settling of solid particles therefrom, and then pumped into a second pressurized chamber. That system was commercially expensive to produce, in part by virtue of the use of two pressurized vessels, and also had certain limitations as to its efficacy dependent upon the type of raw fluid to be treated.

The prevalence of raw fluid in many types of industrial applications and locations, requiring solids extraction or removal therefrom, is suggestive of the high commercial need for a cost effective and reasonably portable system to perform this function. If there were a way to build a system more cost effective and simpler in design, and which could provide enhanced efficacy in additional applications, it is believed that such a system or a method would be commercially accepted. As well, if there were systems that provided maximized efficacy with minimized cost in comparison to mainframe biological systems, this would also be considered to be a commercial benefit.

SUMMARY OF THE INVENTION

It is the object of the present invention to provide a system which can be used to remove suspended solids from raw waste fluid, such as waste water or the like, in a more efficient and reliable and less costly manner than the methods currently available.

The further object of the present invention is to provide an apparatus or method which could be used to replace or supplement a mainframe biological system, and/or which would provide enhanced efficacy and minimize production cost for the system and equipment over prior art systems.

The invention, a system for the clarification of raw fluid containing suspended solids by separation of the raw fluid into clarified fluid and settled solids, accomplishes its objectives comprising firstly a vertically oriented unpressurized settling tank which is capable of receiving raw fluid from a raw fluid source. The vertically oriented unpressurized settling tank would have a top and a bottom, and a sludge discharge located at the bottom thereof through which settled solids settled therein could be removed from the settling tank. The second component of the invention is a vertically oriented pressurizable clarification vessel which also has a top and a bottom, and which also has a raw fluid injection inlet located along a side of the vessel between the top and the bottom. There is also a clarified fluid discharge at the top of the clarification vessel, and a settled solids discharge at the bottom of the clarification vessel.

A conduit has an intake end connected to a settling discharge of the settling tank near the top of the settling tank, and an injection end of the conduit is connected to the raw fluid injection inlet on the clarification vessel.

There is also a controllable raw fluid injection valve within the conduit, through which raw fluid can be injected into the clarification vessel from the settling tank. The portion of the conduit between the settling tank discharge and the raw fluid injection valve is the non-pressurized intake portion of the conduit, for discussion purposes, and the portion of the conduit between the raw fluid injection valve and the raw fluid injection inlet on the clarification vessel is the pressurized injection portion thereof.

The next component of the system, which is a controllable pressure control fluid discharge valve connected to or integral with the clarified fluid discharge on the clarification vessel. Clarified fluid can be discharged from the clarification vessel through this fluid discharge valve.

A controllable pressure control solids discharge valve is also connected to the clarification vessel, at or integral with the settled solids discharge, and through which settled solids can be discharged from the clarification vessel. Finally, injection means to inject raw fluid from the settling tank through the raw fluid injection valve are also included.

In operation of the system, the clarification vessel will be filled with raw fluid by the injection of raw fluid from the settling tank through the conduit, more specifically by pressuring raw fluid through the raw fluid injection valve by the injection means. Suspended solids will settle to the bottom of the clarification vessel, at this point being settled solids for discharge through the solids discharge valve to the non-pressurized solids downstream. Clarified fluid from which suspended solids have settled will be discharged from the fluid discharge valve to a non-pressurized fluid downstream. The selected operating pressure of the clarification zone defined by the clarification vessel between the raw fluid injection valve, the fluid discharge valve and the solids discharge valve will be maintained during the injection of raw fluid or the discharge of clarified fluid or settled solids therefrom. Maintenance of a selected and relatively constant pressure within the clarification vessel during operation is key to the efficacy of the system and method of the present invention.

The system can be operated in many ways to maintain the operating pressure of the clarification zone. It is specifically contemplated that the operating pressure of the clarification zone can be maintained by cooperation of the raw fluid injection valve, the fluid discharge valve and the solids discharge valve during the injection of raw fluid or the discharge of clarified fluid or settled solids from the clarification vessel. These valves could be operated manually by an operator, or could be actuated in conjunction with each other by a computerized control system so as to allow for most appropriate discharge of clarified fluid or settled solids waste while new raw fluid is injected into the clarification vessel, etc.

In some embodiments of the system of the present invention, actuation of the fluid discharge valve to discharge clarified fluid from the clarification vessel would be done at the same time that the raw fluid injection valve was actuated, so as to inject sufficient volume of additional raw fluid into the clarification vessel to maintain the operating pressure therein, as clarified fluid is drawn off through the fluid discharge valve to the downstream non-pressurized fluid area. Similarly, actuation of the solids discharge valve to discharge settled solids from the bottom of the pressurized clarification vessel could be done at the same time and in conjunction with the actuation of the raw fluid injection valve, so as to actuate the raw fluid injection valve and inject sufficient volume of additional raw fluid into the clarification vessel to maintain operating pressure therein while settled solids are drawn off the bottom of the clarification vessel again to the non-pressured solid discharge downstream.

As outlined above, the injection means, the raw fluid injection valve, the fluid discharge valve and the solids discharge valve could be manually controlled by an operator, for a basic or serial operation of the system. Alternatively and more desirably, the system could be automated by joint control of the injection means, raw fluid injection valve, fluid discharge valve and solids discharge valve, so as to maintain as closely as possible constant pressure at the desired pressure level within the clarification zone, during the operation of the system and based on injection of raw fluid which is partially clarified from the settling tank.

The system may also include a programmable valve controller which was capable of individually controlling the actuation of the injection means as well as the opening or closing of each of the raw fluid injection valve, the fluid discharge valve and the solids discharge valve, to maintain constant operating pressure in the clarification vessel during operation. A programmable valve controller such as this is the likely most desirable embodiment of the system although manually operated embodiments are also obviously contemplated within the scope of the present invention.

The system of the present invention could accomplish its objectives of allowing for the separation of suspended solids from a raw waste fluid or effluent, by operation in either a batch mode or a continuous feeding and discharge mode. In a continuous feeding and discharge mode, raw fluid would be injected into the clarification vessel at the same time as clarified fluid is discharged therefrom, or at the same time as settled solids are ejected from the bottom of the clarification vessel.

Some other embodiments of the system of the present invention would include the incorporation of interior fighting into the injection portion of the conduit, so that the raw fluid passing therethrough on injection into the clarification vessel was more aggressively mixed or agitated in advance of the placement or entry of that raw fluid into the clarification vessel. In place or in addition to the placement of interior flighting in the injection portion of the conduit, the injection portion of the conduit might also be designed to consist of a plurality of tubular sections of varying diameters, which could exert a venturi mixing effect on raw fluid passing there through. These venturi sections in the injection portion of the conduit again may be straight walled inside, or may include interior flighting or other protuberances to more aggressively mix or to enhance the venturi effect upon the raw fluid passing there through.

The injection portion of the conduit would likely be configured to be positioned horizontally in relation to the vertically positioned clarification vessel.

The system might be further modified by adding at least one injector to the injection portion of the conduit by which one or more chemical or floccing agents could be injected into raw fluid passing there through before entry into the clarification vessel, for the purpose of enhancing the flocking or settlement activity of sediment from the raw fluid in the clarification vessel.

Varying types of operating pressures could be used in the clarification vessel but it is specifically contemplated that for many types of raw fluid or effluent an operating pressure of the clarification vessel in the range of 10 to 20 pounds per square inch would be desirable.

The injection means would most likely be a pump which was used to inject raw fluid into the injection portion of the conduit.

The system might also additionally include an overflow line which was connected from near the top of the settling tank back to the raw fluid source to allow for the recirculation of raw fluid in the non-pressured first tank in the system. One or more grinding pumps might also be displaced within the settling tank or in front of the injection means, to allow for the grinding of suspended solids within the raw fluid.

In addition to a system for the clarification of raw fluid containing suspended solids, there is also disclosed a method of accomplishing same. The method comprises first providing a fluid clarification system comprising of a vertically disposed nonpressurized settling tank capable of receiving raw fluid for clarification from a raw fluid source, said settling tank having a top and a bottom and a sludge discharge located at the bottom thereof through which settled solids from raw fluid settle therein can be removed from the settling tank; and a vertically oriented pressured clarification vessel having a top and a bottom, the clarification vessel also having a raw fluid injection inlet located along a side of a vessel between the top and the bottom, a clarified fluid discharge at the top of the vessel and a settled solids discharge at the bottom of the vessel.

The settling tank and the clarification vessel would be connected by a conduit which has an intake end and an injection end. The intake end of the conduit would be connected to the settling tank at a settling discharge near the top of the settling tank, and the injection end of the conduit would be connected to the raw fluid injection inlet on the clarification vessel. A controllable raw fluid injection valve would also be provided within this system within the conduit through which raw fluid could be injected into the clarification vessel from the settling tank, the portion of the conduit between the settling discharge and the raw fluid injection valve being the non-pressured intake portion and the portion of the conduit between the raw fluid injection valve and the raw fluid injection inlet being the pressurized injection portion.

A controllable pressure control fluid discharge valve would also be connected to or integral with the clarified fluid discharge, through which clarified fluid could be discharged, and a controllable pressure control solids discharge valve would be connected toor integral with the settled solids discharge, through which settled suspended solids could be discharged from the clarification vessel. Finally, there would be within this apparatus injection means, such as a pump or the like, to inject raw fluid from the settling tank through the raw fluid injection valve into the clarification vessel up to operating pressure.

In the method, the clarification vessel would be filled with raw fluid by actuating the injection means to inject raw fluid into the vessel from the settling tank through the conduit, until the desired operating pressure in the clarification vessel was reached. Following settling of settled solids from the raw fluid contained within the clarification vessel, additional raw fluid would be injected into the clarification vessel through the raw fluid injection valve and the conduit, while maintaining the desired operating pressure in the clarification vessel by discharging clarified fluid to a non-pressurized fluid downstream by actuating the fluid discharge valve or discharging settled solids to a non-pressured solids downstream by actuating the solids discharge valve. In either case the operating pressure within the clarification vessel would be maintained while the settlement and removal method for settled solids from the raw fluid, which was first settled partially in the settling tank, would be accomplished in accordance with the remainder of the method.

The operating pressure of the clarification vessel is maintained by the cooperation of the raw fluid injection valve, the fluid discharge valve and the solids discharge valve, the remaining injection of raw fluid or the discharge of clarified fluid or settled solids therefrom. For example in actuation of the fluid discharge valve to discharge clarified fluid from the top of the clarification vessel, the raw fluid injection valve could be actuated to inject sufficient volume of additional raw fluid into the clarification vessel to maintain operating pressure therein. Similarly, by actuation of the solids discharge valve at the base of the clarification vessel to discharge settled solids therefrom, the raw fluid injection valve could be actuated along with the injection means to inject sufficient volume of raw fluid into the clarification vessel to maintain operating pressure as well.

The injection means, the raw fluid injection valve, the fluid discharge valve and the solids discharge valve could be manually controllable by an operator, or could be automated, for example by the incorporation of a programmable valve controller capable of individually controlling the actuation of the injection means as well as the opening or closing of each of the raw fluid injection valve, the discharge valve and the sludge valve, to maintain the constant operating pressure in the clarification vessel during operation.

The system could be operated in this method either in batch or continuous feeding mode. Continuous feeding mode would be most desirable. In continuous feeding mode, raw fluid could be injected into the clarification vessel at the same time as clarified fluid or solids are discharged therefrom.

The method could also be further enhanced by providing aggressive mixing activity to be exerted upon the raw fluid on injection into the clarification vessel. This might be accomplished either by placing interior flighting inside of the conduit to mix the raw fluid passing there through, or even configuring the injection portion of the conduit to be comprised of a plurality of tubular sections of varying diameters which would exert a venturi mixing effect upon raw fluid passing there through.

Chemical or other fleecing agents could be injected into raw fluid passing through the injection portion of the conduit by at least one injector to allow for the aggregation of solids and the better settlement therefrom. Many different types of operating pressures could be practiced in the method of the present invention but it is specifically contemplated that operating pressure in the clarification zone of the clarification vessel would be in the range of 10 to 20 pounds per square inch.

The raw fluid could be ground by at least one grinding pump in advance of entry into the settling tank or while in the settling tank, to grind the suspended solids therein.

A method and system as outlined above will represent a substantial enhancement over the state of the art both in terms of cost efficiency of manufacture of systems of this type as well as for the purpose of treatment of specific particularly toxic or difficult to clean raw fluids or effluents requiring the removal of suspended sediments therefrom.

Both downstream fluid processing as well as downstream sterilization or further use for treatment of solids recovered from the fluid separation process could be conducted in various types of either pressurized or non-pressurized systems, beyond the point of discharge from the settling tank or clarification vessel. The method and process of the present invention provide for superior cleaning of waste water or other raw fluids, and the removal of suspended sediments therefrom, more reliably and with a more cost efficient and mechanically efficient equipment footprint than other systems currently in use in the industry.

By altering the chemical agents injected into raw fluid before entry into the clarification vessel, different types of suspended sediments and raw fluids can be treated and efficiency of the system maximized in terms of the suspension of solids being mitigated, and the solids being settled off from the clarified fluid to be discharged therefrom.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numerals, and where:

DETAILED DESCRIPTION OF THE INVENTION

The present invention is a system and method for the removal of suspended solids from effluent or other raw fluids or waste water. The system would be used to separate approximately solid fractions from waste water or other similar fluids—the solid fraction in many cases might consist of a combination of grit and sludge, and in other cases might comprise more toxic chemical or other types of solids or waste within that water or other fluid.

While the invention and this application speak specifically to the use of this system and method for the cleaning and recovery of suspended solids from waste water and similar effluent it is also foreseeable that other types of raw fluid or effluents might be cleaned using the same type of a treatment system and method.

Figure 1:
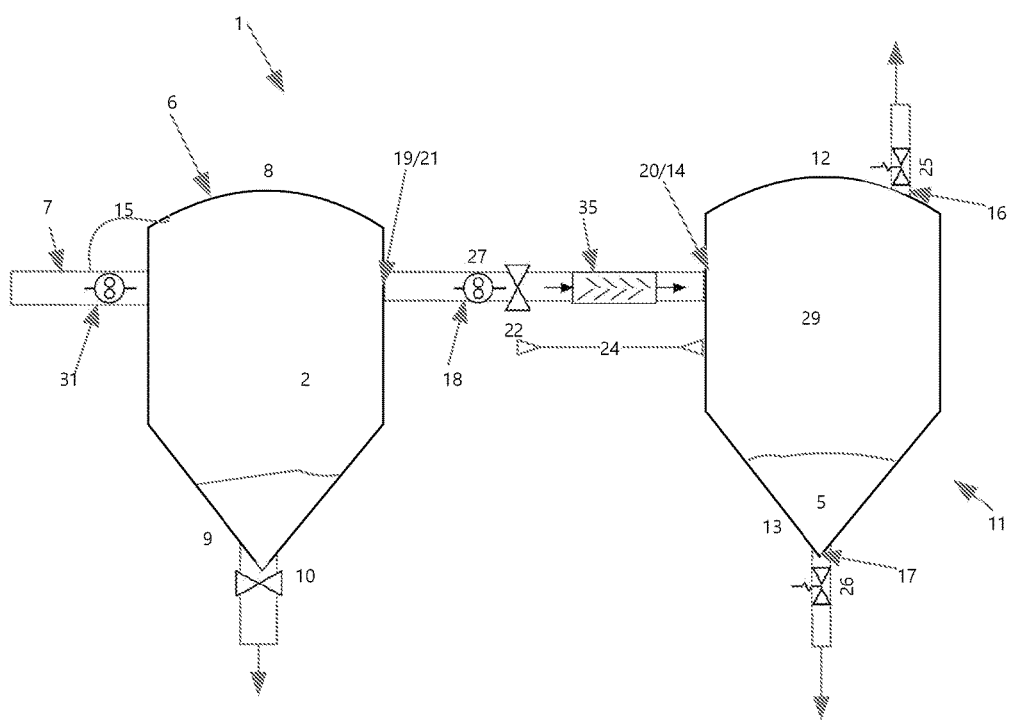
FIG. 1 is a block diagram of one embodiment of the system of the present invention.

System Architecture:

FIG. 1 demonstrates one embodiment of the system 1 of the present invention for the clarification of raw fluid containing suspended solids, by separation of the raw fluid into clarified fluid and settled solids. The three key components are a nonpressurized settling tank 6, the pressurized venturi mixing in conduit 18 and a pressurized clarification vessel 11, as outlined in further detail below.

There is firstly shown a vertically oriented nonpressurized settling tank 6. The settling tank 6 is capable of receiving raw fluid 2 from a raw fluid source 7. The raw fluid source could be a pump, well, pipeline or other access to raw fluid 2 being pumped or made available to the unpressurized settling tank 6 from a raw fluid storage resource area.

The settling tank 6 has a top 8 and a bottom 9. At the bottom 9 of the settling tank 6 there is a sludge discharge 10. Settled solids 5 can be discharged through the sludge discharge 10. The sludge discharge 10 would likely comprise a valve or other access means by which settled solids or sludge could be accessed and pushed out of the settling tank 6 at appropriate times.

The second component shown is a vertically oriented pressurizable clarification vessel 11, which also has a top 12 and a bottom 13. The clarification vessel 11 also has a raw fluid injection inlet 14 which is located along one side thereof, at which raw fluid 2 can be injected into the clarification vessel 11.

The clarification vessel 11 would also have a clarified fluid discharge 16 located at the top end 12 thereof. The clarified fluid discharge 16 would be an egress through which clarified fluid could be evacuated to a nonpressurized downstream. The clarification vessel also includes a settled solids discharge 17 at the bottom 13 thereof. The settled solids discharge 17 would be an egress by which settled solids which were settled out of raw fluid processed in the system could be evacuated from the clarification vessel to a nonpressurized solids downstream.

The settling tank 6 and the clarification vessel 11 are connected by a conduit 18. The conduit 18 has an intake end 19 and an injection end 20. The intake end 19 of the conduit 18 is connected to a settling discharge 21 of the settling tank 6, near the top 8 of the settling tank 6, and the injection end 20 of the conduit 18 is connected to the raw fluid injection inlet 14 on the clarification vessel 11. Raw fluid 2 from which partial solids have been settled out within the settling tank 6 could move from the settling tank 6 to the clarification vessel 11 through the conduit 18.

The next element which can be seen in this Figure is a controllable raw fluid injection valve 22 within the conduit 18, through which raw fluid 2 can be injected into the clarification vessel 11 from the settling tank 6 and which defines the beginning of the pressurized clarification zone for the mixing and clarification of the raw fluid. The raw fluid injection valve 22 is important as a means to provide a break between the pressurized and unpressurized zones of the system of the present invention—the portion of the conduit 18 which is between the raw fluid injection valve 22 and raw fluid injection inlet 14 is the pressurized injection portion 24.

Also shown are injection means 27, which are a means by which the raw fluid 2 can be injected from the settling tank 6 through the raw fluid injection valve 22 into the clarification zone defined by the clarification vessel 11 and the injection portion 24 of the conduit. The injection means 27 would most likely be a pump although there could be other circumstances in which other types of mechanical assistance could be used to pressurize the raw fluid 2 through the raw fluid injection valve 22 into the injection portion 24 of the conduit 18.

Also shown is a controllable pressure control fluid discharge valve 25, which is connected to the clarified fluid discharge 16 on the clarification vessel 11. It is through this fluid discharge valve 25 that clarified fluid 4 can be discharged from the clarification vessel 11 to the nonpressurized downstream for clarified fluid. In addition to the fluid discharge valve 25, there would also be a controllable pressure control solids discharge valve 26 which is connected to the settled solids discharge 17 on clarification vessel 11, through which settled solids 5 can be discharged from the clarification vessel 11. Both valves 25 and 26 are contemplated to be pressure control valves, since upon appropriate configuration and adjustment of these types of valves they can assist in the maintenance of appropriate pressure within the clarification vessel 11. Maintenance of a desired operating pressure within the clarification vessel 11 is a key element of the method herein.

In operation of the system, the clarification vessel 11 would be filled with raw fluid 2 by the injection thereof from the settling tank 6 through the conduit 18. Suspended solids 5 would settle to the bottom of the clarification vessel 11, being settled solids 5 for discharge through the solids discharge valve 26 to a nonpressurized solids downstream. Clarified fluid 4 from which suspended solids 5 have settled can be discharged from the fluid discharge valve 25 to a nonpressurized fluid downstream.

The selected operating pressure within the clarification zone 29, which is defined by the clarification vessel 11 between the raw fluid injection valve 22 through to the fluid discharge valve 25 and the solids discharge valve 26 would be maintained during the injection of raw fluid 2, or during the discharge of clarified fluid 4 or settled solids 5 from the clarification vessel 11. The operating pressure within the clarification zone 29 would be maintained by cooperation of the raw fluid injection valve 22, the fluid discharge valve 25 and the solids discharge valve 26, during the injection of raw fluid or the discharge of clarified fluid or settled solids from the clarification vessel 11. These valves could be operated manually to work in cooperation with each other, or might in other embodiments be actuated by a programmable valve controller. In the embodiment shown in FIG. 4, a basic embodiment in which manual operation of the valves is contemplated is shown.

To recover clarified fluid from the clarification vessel 11, the fluid discharge valve 25 could be actuated to allow for the discharge of clarified fluid from the clarification vessel 11. At the same time, the raw fluid injection valve 22 would be actuated, likely in conjunction with the injection means 27, to inject sufficient volume of additional raw fluid into the clarification vessel 11 to maintain the desired operating pressure within the clarification zone. Upon the completion of the evacuation of the desired quantity of clarified fluid from the clarification vessel 11, closure of the fluid discharge valve 25, and the raw fluid injection valve 22 in conjunction therewith would result in continued operation of the solids settlement method within the clarification vessel, to maintain the selected operating pressure.

Similarly if it is desired to discharge settled solids from the bottom of the clarification vessel 11, the raw fluid injection valve 22 would be actuated along with the solids discharge valve 26, to effectively push settled solids out of the bottom of the clarification vessel 11.

The system could either be operated manually or automated in such a way that it could run in batch mode, whereby the raw fluid injection valve 22 would be actuated from time to time along with the injection means 27 to push an entire new batch of raw fluid into the clarification zone 29, and at the same time the complete quantity of available clarified fluid would be removed from the clarification vessel by at the actuation of the fluid discharge valve 25, and then at the same time or following the closure of that fluid discharge valve 25 the solids discharge valve 26 can be opened to push out some or all of the settled solids present within the clarification vessel.

It will also be understood however that in certain embodiments of the method and system of the present invention rather than running in a batch mode, when the appropriate operating parameters were determined the system could simply be fed continuously by allowing for the continuous modest injection of raw fluid through the raw fluid injection valve, and at the same time potentially leaving open or allowing for the pressure control activation of the fluid discharge valve to allow for the continued evacuation of clarified fluid to the nonpressurized clarified fluid downstream, and the ability to occasionally actuate the settled solids discharge valve 26 to again push out some of the settled solids present within the clarification vessel 11.

Both the settling tank 6 and the clarification vessel 11 would likely have conical bottoms. However a conical bottom in either of the settling tank 6 of the clarification vessel 11 will be understood to not be a mandatory element and different bottom shapes or profiles on these units would not depart from the scope and intention hereof.

Also shown in this Figure is interior flighting in the conduit 18 to apply venturi mixing forces to the raw fluid passing therethrough.

Figure 2:
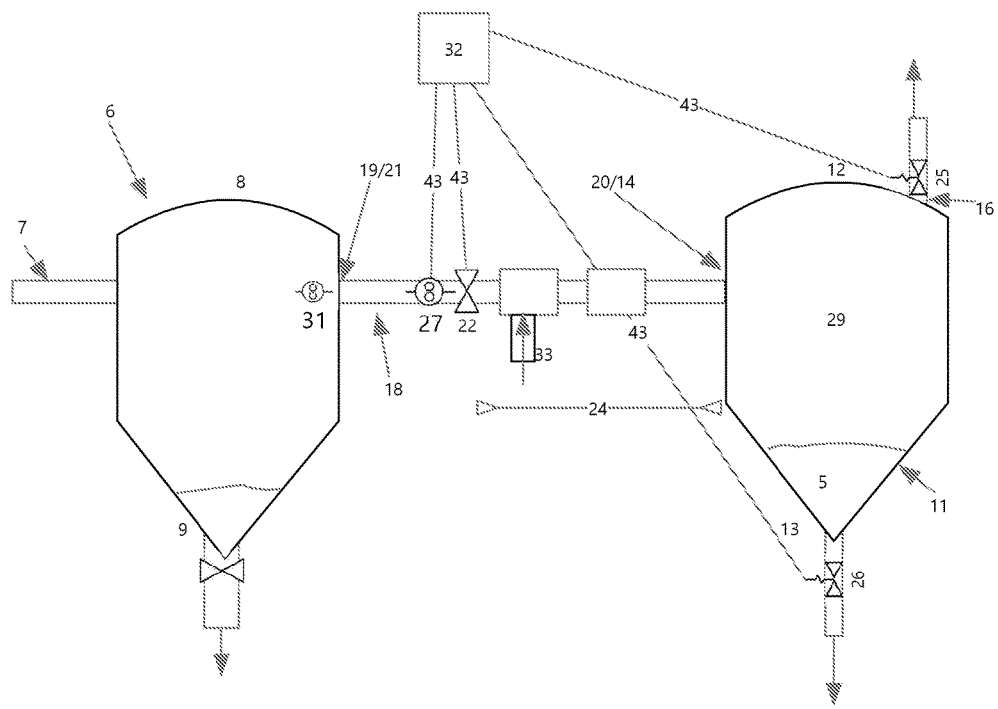
FIG. 2 is a block diagram of an alternate embodiment of the system of the present invention, demonstrating the venturi configuration of the conduit and the placement of a grinding pump within the settling tank.

Referring next to FIG. 2 there is shown a second embodiment of the system of the present invention, with a number of key additional functions—specifically the system which is demonstrated in this Figure includes a programmable valve controller as well as a plurality of chemical injectors in the conduit, and a grinding pump within the settling tank, as outlined in further detail below.

This Figure demonstrates the incorporation of a grinding pump 31 into the settling tank 6 for the purpose of grinding up the settled solids within the raw fluid 2—by rendering raw fluid with reasonably uniform particle size the method of the present invention is best practiced. The grinding pump or pumps 31 could be located within the settling tank 6 or elsewhere in relation to the settling tank 6, before the entry of raw fluid 2 into the settling tank 6 closer to the raw fluid source, or even upon the discharge of raw fluid in a partially settled form from the settling tank 6 it may be desired to either conduct a first or supplemental grinding of the raw fluid at that time and a raw fluid grinding pump could be introduced at that point in the system as well.

Also shown in this embodiment is a programmable valve controller 32, connected to the raw fluid injection valve 22, the injection means 27, the fluid discharge valve 25 and the solids discharge valve 26. Depending upon the type of equipment that was present on each of those valves, the programmable valve controller 32 might be able to exercise different types or degrees of control upon those valves and their actuation. For example in the case of an open or closed valve configuration, the control which could be exercised by the program valve controller 32 might be more binary in nature where it could effectively turn the valve on or turn the valve off. Alternatively and more likely it is contemplated that the valves would each be variable in control and that the programmable valve controller 32 could control the amount of opening and actuation of each of these valves in cooperation with each other, dependent upon the outcome desired—for example if it was desired to push solids from the settling point at the base of the clarification vessel 11 out of the clarification vessel 11, the fluid discharge valve 25 might be locked shut, and the solids discharge valve 26 allowed to push a maximum portion of settled solids off of the bottom of the clarification vessel while new raw fluid 2 was injected through the raw fluid injection valve 22. Alternatively it might be the case that the solids discharge valve 26 would be completely closed and the fluid discharge valve either opened to a specific degree or allowed to operate in a pressure control mode to automatically allow for the evacuation of a certain level of clarified fluid from the clarification vessel 11, based upon the injection of new raw fluid 2 via the conduit 18. In certain cases the controller might also actuate all three valves at the same time if it was desired to effectively try to in a serial injection format continually draw off clarified fluid and settled solids from the clarification vessel 11 during operation of the system and the method. The programmable valve controller 32 would also be connected to necessary sensors to determine or monitor the operating pressure in the clarification zone.

It may be desired to inject one or more chemical agents into the raw fluid 2 as it enters into the clarification vessel 11. There are a number of ways to do this—in the prior art, chemical or floccing agents were injected into the settling tank 6 which was also pressurized and they were mechanically mixed into the raw fluid. In this case what is contemplated as a novel enhancement is the injection of those agents through one or more chemical injectors 33 in the conduit 18 after the raw fluid injection valve 22—ie. the injection of these agents would take place inside the pressurized zone. Configuration of the remainder of the injection portion of the conduit 18 to provide for a maximized venturi mixing effect on the raw fluid passing therethrough would result in a very good mixing of the chemical agents into the raw fluid 2 in advance of its entry into the main body of the clarification vessel 11.

As outlined above, it is desired to provide a conduit 18 which will maximize the venturi mixing effect exerted upon the raw fluid 2 passing therethrough into the clarification vessel 11. There are a number ways of accomplishing this although what is specifically contemplated as a reasonably simple manufacturing approach is to manufacture the conduit 18 out of a plurality of tubular sections of varying diameters, such that fluid passing therethrough would be agitated and mixed. The plurality of tubular sections of varying diameters are shown in this Figure. Also shown in this Figure in dotted relief is the incorporation of interior fighting 35 into some or all of the sections of the conduit 18, which would further mix the raw fluid 2.

Cooperation of the Valves:

Two key elements of the method of the present invention are the fact that a constant operating pressure is maintained within the clarification zone 29 defined by the clarification vessel 11 and the injection portion of the conduit 18, as well as the fact that the three valves, namely the raw fluid injection valve 22, the fluid discharge valve 25 and the solids discharge valve 26 are operated in cooperation with each other to allow for the maintenance of that standardized or selected operating pressure within the clarification zone 29 while allowing for the ongoing injection of new raw fluid 2 into the clarification zone 29 and the drawing off of clarified fluid and settled solids therefrom.

The fluid discharge valve 25, and the solids discharge valve 26, are both pressure control valves—that is to say that they can each be configured to open and allow the egress of fluid or solids therethrough when a particular pressure is reached on one side of the valve. By using pressure control valves for these two components, they could be configured to automatically open and allow the discharge of certain amounts of solids or fluids from the clarification vessel 11, as new raw fluid 2 was injected. In addition to them being pressure control valves however, it is also specifically contemplated that these valves could be actuated or adjusted.

It is specifically contemplated that the raw fluid injection valve 22 would not be a pressure control valve, but certain other embodiments of the system and method of the present invention might replace either the fluid discharge valve 25 or the solids discharge valve 26 with a standard non-pressure control valve and those embodiments are also contemplated within the scope of the present invention.

The actual programmable valve controller 32 itself would be any type of a control system or programmable logic controller which could be adjusted or operated by the operator of the remainder of the system of the present invention and which could be connected to actuate the valves and the injection means—the desired operating parameters can either be hard programmed into the system or could be adjusted by the operator during operation. The programmable valve controller 32 would likely in addition to controlling three valves also interface and control the injection means, wherein if the injection means is a pump, the injection means/pump could automatically be turned on when it was going to be desired to inject raw fluid into the remainder of the system past the raw fluid injection valve 22, and the pump could be turned off when it was not desired to be running.

Figure 3:
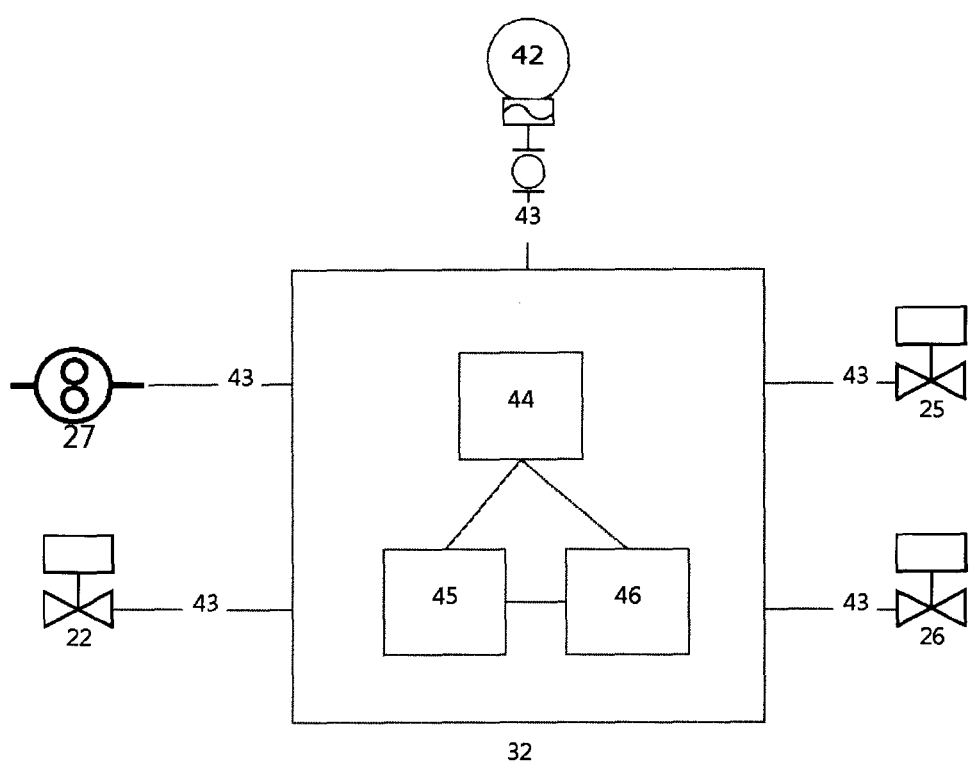
FIG. 3 is a schematic of one embodiment of an automated valve controller in accordance with the present invention.

Automated Valve Controller:

FIG. 3 shows a schematic of one possible embodiment of a programmable valve controller 32 which could be used in accordance with the present invention.

The valve controller 32 is operatively connected to the raw fluid injection valve 22, the fluid discharge valve 25, the solids discharge valve 26, the injection means 27 and at least one pressure sensor 42, to provide appropriate control signals to the valves and injection means to inject raw fluid into the clarification zone 29 from the settling tank 6, and to maintain constant operating pressure within the clarification zone 29 while raw fluid is injected and clarified fluid is discharged from the fluid discharge valve 25 or solids are discharged from the solids discharge valve 26.

The valve controller 32 would also be interfaced with at least one pressure sensor 42 located within or capable of sensing the pressure within the clarification vessel 11 and clarification zone 29. The valve controller 32 is capable of ascertaining the operating pressure within the clarification zone 29 by receiving a signal or pressure indication from the at least one pressure sensor 42, and then actuating the injection means 27 and the raw fluid injection valve 22 to inject raw fluid into the pressurized clarification zone 29 based upon the pressure reading of the at least one pressure sensor 42 to obtain or maintain the desired pressure within the clarification zone 29. If the pressure in the clarification zone 29 exceeds the desired pressure level, the fluid discharge valve 25 and/or the solids discharge valve 26 could be actuated to discharge volume from the clarification zone 29 and reduce the pressure therein to the desired level.

The at least one pressure sensor 42 can be any of a variety of sensors that are configured to produce an discharge signal that varies depending on the pressure that the sensor senses. Those of skill in the art will readily appreciate the most appropriate type of pressure sensor 42 that is useful with the present system. More than one pressure sensor 42 might be used at different locations within the clarification zone 29 in certain embodiments as well.

Connection of the at least one pressure sensor 42 to the valve controller 32 is shown via a control bus 43 in the Figure. In some embodiments the control bus may comprise an electrical wire connecting the pressure sensor 42 and the controller 32. In some embodiments the control bus can comprise a wireless signal that is transmitted from the pressure sensor 42 to the controller 32. Those of skill in the art will recognize that where wireless transmission is employed the discharge signal from the pressure sensor will be passed to a transmitter that then wirelessly passes the signal to the controller 32. In such cases the controller 32 will have receiving means configured to receive the wireless signal from the pressure sensor transmitter.

FIG. 3 is a schematic diagram of the key components of one embodiment of the valve controller 32 of the present invention. The controller 32 can comprise a transceiver module 44, configured to receive pressure information from the pressure sensor 42, either by a wired or wireless bus connection as discussed above. The transceiver module 44 is able to produce a variety of discharge signals, for example a signal to a display 45 or actuation signals to actuate the injection means 27, the raw fluid injection valve 22, the fluids discharge valve 25 or the solids discharge valve 26. When in use, an operator can determine the pressure within the clarification zone by referring to the display 45. An operator can adjust the pressure control selector 46 in order to select a desired pressure, or the operating pressure might be hard programmed into the controller memory of the controller 32. The pressure control selector 46 and/or temperature display 45 can be designed to provide warning indications if the actual pressure in the clarification zone are outside a pre-determined acceptable range relative to the selected or desired pressure.

The raw fluid injection valve 22, the injection pump/means 27, the solids discharge valve 26 and the fluid discharge valve 25 are all shown demonstratively connected via control bus connections 43 to the controller 32 as well.

The pressure control sensor 42 provides a discharge signal to the transceiver module 44. The transceiver module processes the discharge signal from the pressure sensor 42 and uses that information in order to actuate the injection means 27 and the raw fluid injection valve 22 to inject raw fluid into the pressurized clarification zone 29, if the pressure is too low. If the pressure in the clarification zone 29 exceeds the desired pressure level, the fluid discharge valve 25 and/or the solids discharge valve 26 could be actuated to discharge volume from the clarification zone 29 and reduce the pressure therein to the desired level. When fluid injection to the clarification zone 29 is not required, the controller 32 can deactivate the injection means/pump 27.

Overall the controller 32 could be designed to with varying degrees of automation or operator intervention required to control the injection pump 27 and the three interconnected valves 22, 25 and 26, to provide for the operation of the method and clarification of fluid within the clarification vessel 11 at a constant operating pressure. With or without an operator pressure control as shown etc., the controller 32 could contain a PLC or other electronic hardware and software to allow for the automation and practice of the method including the maintenance of pressure within the clarification zone, the timely discharge of clarified fluid and settled solids etc. All such approaches which would have the same result of controlling these three valves and the injection means to practice the remainder of the invention that is to say to inject raw fluid into the pressurized clarification vessel and maintain the pressure within that vessel while additional raw fluid is injected or solids or clarified fluid or discharge therefrom, are all contemplated within the scope of the present invention.

Figure 4:
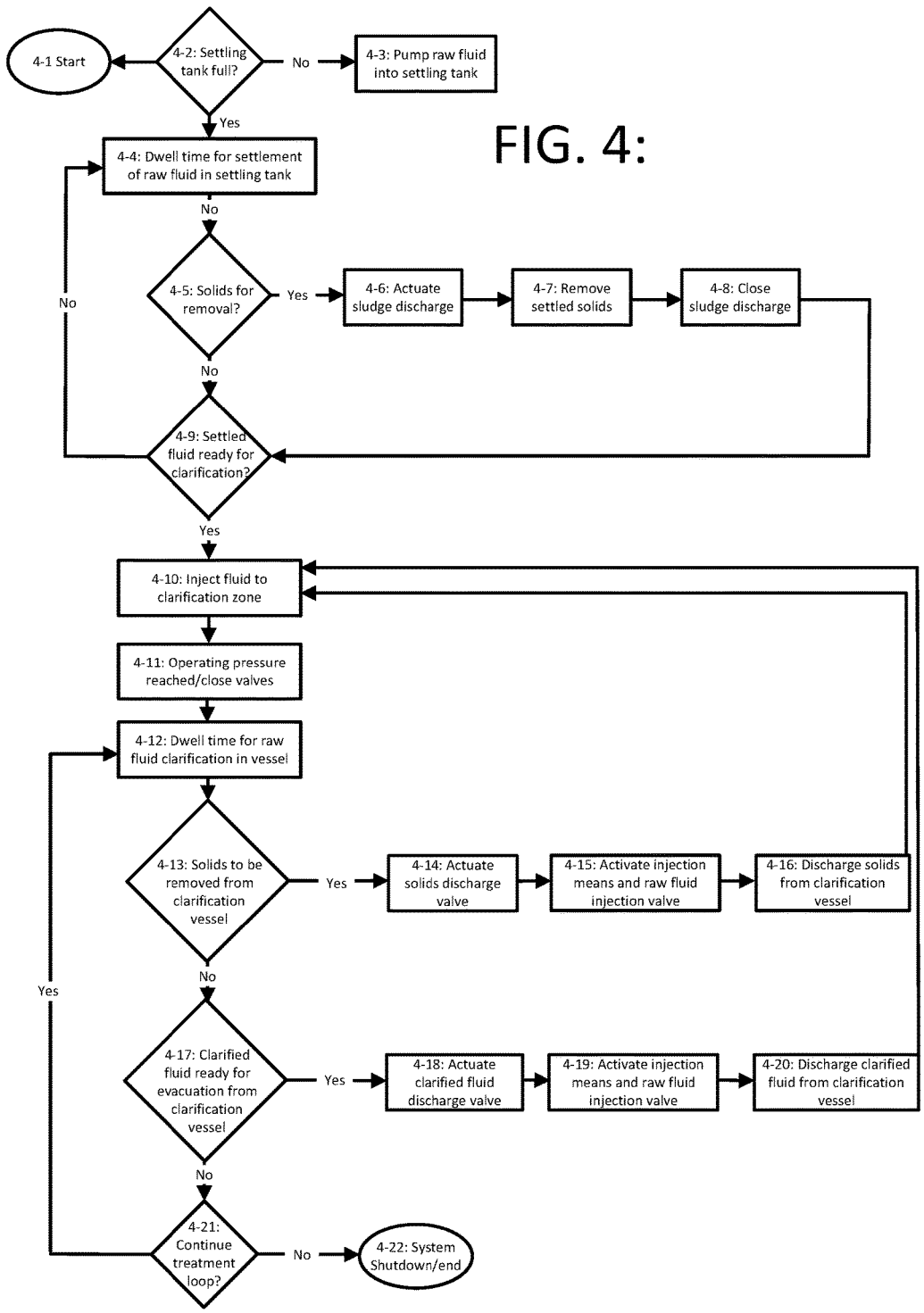
FIG. 4 is a flow chart demonstrating the steps in one embodiment of the method of the present invention.

General Method Overview:

Referring first to FIG. 4 there is shown a flowchart of a first embodiment of the clarification method of the present invention, which would be practised in accordance with an embodiment of the system of the present invention approximately in accordance with that shown in FIG. 1. At the start of the method, shown at step 4-1, the system would be actuated to start the clarification of raw fluid. The settling tank 6 would be filled with raw fluid 2. This would be done by pumping or other entry of raw fluid 2 from the raw fluid source into the settling tank 6. Testing the fullness of the settling tank 6 is shown at step 4-2 in the Figure. If the settling tank 6 was not full, additional pumping of raw fluid 2 into the settling tank 6 would be done as shown at step 4-3 until the settling tank 6 was full or at a desired operating level.

Raw fluid 2 would be maintained within the settling tank 6. Once it was desired to move to the next step of the method, as shown by the logic or decision block at 4-5, it was decided that solids needed to be removed from the settling tank 6, the sludge discharge 10 could be actuated, shown at step 4-6, for the removal of settled solids at 4-7 therefrom. Following the removal of settled solids from the bottom of the settling tank 6, the sludge discharge 10 could be closed, shown at step 4-8, and the method could continue.

At such point in time as there was settled raw fluid which was ready for further clarification contained within the settling tank 6, shown at step 4-9, that fluid could be injected into the clarification zone 29. Injection of the partially settled raw fluid from the settling tank 6 into the clarification zone 29 via a conduit 18 and the injection means etc. is shown at step 4-10.

As the system was pressurized and on an ongoing basis, it would be desired to reach the desired operating pressure within the clarification vessel 11. Reaching the desired operating pressure is shown at step 4-11 in this Figure. Once the desired operating pressure is reached, it would be maintained throughout the operation or cycle of the system.

It is contemplated that there would be a particular dwell time which would be desirable for the settling of solids from raw fluid within the clarification vessel 11. This dwell time frame is shown at step 4-12. The dwell time frame would be something of a moving target where the system was being serially fed. It will be understood by the operator at the time that a particular desired dwell time or speed of operation of the system even in serially fed embodiment could be determined based upon determining from the type of fluid being clarified, and the amount of solids to be settled etc. what the approximate amount of time or operational speed is that could be used to arrive at a result of the desired amount of settled solids evacuated therefrom and properly clarified fluid being ready for evacuation are discharged from the clarification vessel 11.

During operation of the system as solids have settled to the base of the clarification vessel 11 in sufficient quantity that they need to be removed, shown by a logic test block at 4-13, the solids discharge valve 26 would be actuated, shown at step 4-14 in conjunction with the raw fluid injection valve 22 and the injection means 27, whereby additional raw fluid would be injected into the clarification vessel and based on the pressure within the vessel, the settled solids from the base of the vessel 11 would be pushed out of the vessel 11 through the solids discharge valve 26.

Once a sufficient quantity of settled solids was discharged from the clarification vessel 11, shown at step 4-16, the solids discharge valve 26 could be deactivated, and similarly the injection means 27 and the raw fluid injection valve 22 operated in such a way or terminated in such a way that again the desired operating pressure is maintained within the clarification vessel 11, and the ongoing clarification of fluid would continue.

Similarly, while raw fluid was being clarified within the clarification vessel if there was clarified fluid which was ready for evacuation from the clarification vessel, to which we direct the reader to step 4-17 in the Figure, the fluid discharge valve 25 would be activated, along with the injection means 27 and the raw fluid injection valve 22—shown at step 4-18 and 4-19. This would result in the injection of fresh raw fluid into the clarification vessel 11 and the evacuation of clarified fluid from the top of the clarification vessel 11 through the fluid discharge valve 25 to the nonpressurized clarified fluid downstream. When the clarified fluid had all been removed or it was desired to return the clarification vessel to the settlement and dwell state, the fluid discharge valve 25 and the raw fluid injection valve 22 could be turned off, potentially along with the injection means 27, to allow for the continued settlement of solids at the maintained desired pressure within the clarification vessel 11.

Either when operating in batch mode or in the serial feed mode, this treatment loop would be continued, shown at step 4-21 until it was desired to terminate the system—for example if maintenance was required, the raw fluid source is depleted or the like. At that point in time, the system shutdown is shown at step 4-22.

It is specifically contemplated that the system of the present invention would in a most desirable mode operate based on a serial feed approach, such that the system could simply be continuously operated for a complete working session. Dependent upon the necessary pressure required to evacuate desired quantity of clarified fluid from the clarification vessel 11, or pressure required to push settled solids out through the solids discharge valve 26, the appropriate amount of injection of raw fluid and pressure could be exerted upon the environment within the clarification zone 29 by the injection means 27 and the raw fluid injection valve 22. Again it will be understood that these valves could be manually actuated by an operator, but in an ideal circumstance a programmable valve controller 32 such as is shown in FIG. 5 and FIGS. 2 and 3 is the likely preference.

Figure 5:
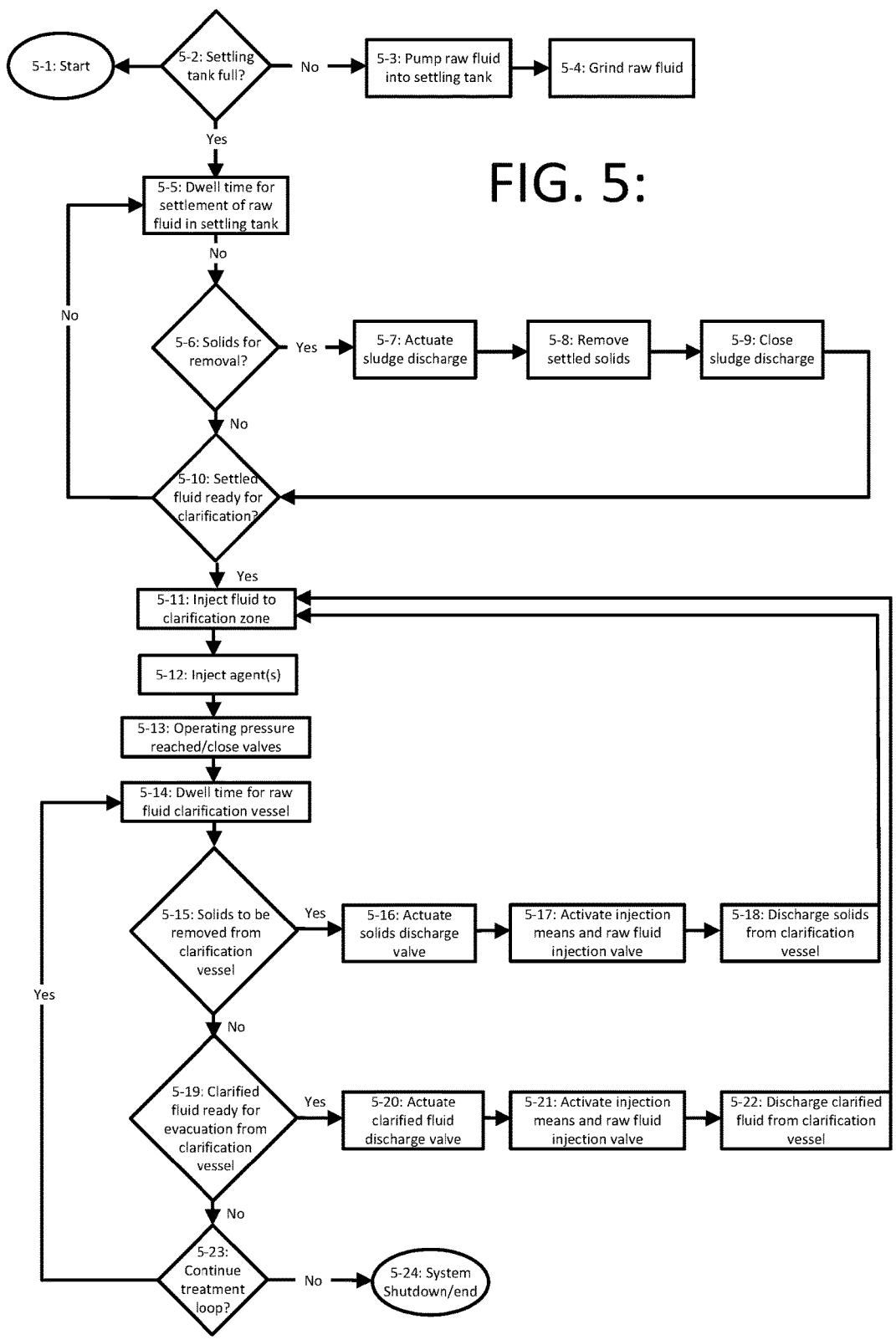
FIG. 5 is a flow chart demonstrating the steps in an alternate embodiment of the method of the present invention, in which the raw fluid is ground in advance of injection into the clarification vessel.

Referring next to FIG. 5 there is shown a flow chart of an alternate embodiment of the method of the present invention. The method shown in this particular flowchart is a method practised more likely in relation to a physical embodiment of the system according more with that shown in FIG. 2 versus FIG. 1—i.e. with a plurality of chemical injectors 33 in the conduit 18, and at least one grinding pump 31 in the settling tank 6.

Referring to this Figure, there is shown the pumping of raw fluid 2 into the settling tank 6 at step 5-3. Raw fluid within the settling tank 6 is ground using a grinding pump 31, shown at step 5-4. That grinding pump 31 might operate on an ongoing basis or be actuated from time to time dependent upon the desired practice or the remainder of the method.

Raw fluid 2 would be taken from the raw fluid source and following grinding would be held in the settling tank 6. That is shown at step 5-5. Solids could be removed, from their settlement location at the base of the settling tank 6 as required and as shown in steps 5-6 through 5-9 in this Figure. At that point in time as the raw fluid 2 contained within the settling tank 6 was ready for further clarification it could be injected into the clarification zone 29.

Moving past the settling tank 6, raw fluid from the settling tank 6 would be injected into the clarification zone 29 therein, shown at step 5-11. As outlined elsewhere herein, the injection of raw fluid 2 from the settling tank 6 towards and into the clarification vessel 11 would take place through the conduit 18. In this particular case, one or more chemical agents would be injected into the raw fluid within the conduit 18 and more specifically within the injection portion of the conduit 18 through one or more injectors. This is shown at step 5-12. The one or more chemical or floccing agents which are injected into the conduit 18 would be mixed with the raw fluid therein, simply by the travel and comminution of the agents with the raw fluid into the clarification vessel 11, most completely and aggressively if there were venturi mixing aspects and components for configuration to the remainder of the injection portion of the conduit 18.

The treatment loop which is shown within the clarification vessel 11 in this Figure is similar to that of FIG. 4—following injection of one or more agents into the raw fluid at 5-12 the introduction of that blended raw fluid into the clarification vessel 11 itself for settling and the subsequent withdrawal of clarified fluid and settled solids therefrom would operate in the same way as the method outlined in FIG. 4.

Venturi Mixing of Raw Fluid:

As outlined, it is explicitly contemplated that the application of a venturi mixing effect on the raw fluid on injection into the clarification zone will result in the maximum uniformity and comminution of the raw fluid, resulting in the ability to generate most efficiently the two fractions of the raw fluid from the clarification vessel being the settled solids and the clarified fluid. Venturi mixing effect is applied to the raw fluid simply by the appropriate shaping and construction of the conduit between the settling tank and the clarification vessel. Various types of venturi mixing mechanisms will be understood to those skilled in the art of fluid transfer systems. In a most basic embodiments, it is explicitly contemplated that the venturi effect could be achieved by manufacturing the injection portion of the conduit in a way that it was comprised of a plurality of tubular sections each of which had varying diameters. Pushing the partially clarified raw fluid from the settling tank through this venturi conduit would result in the application of agitation and mixing forces to the fluid resulting in the most uniform suspension of the solids therein. The venturi effect can be further enhanced by the placement of internal fighting or protuberances inside of the conduit, which would result in further aggressive mixing activity being applied to the fluid passing therethrough without the need for specific or mechanical mixing force to be applied thereto.

It is explicitly understood that any type of a modification to the conduit between the settling tank in the clarification vessel, including those which might have the object of introducing internal flighting or other types of protuberances into the conduit for the purpose of applying a venturi mixing effect to fluid passing therethrough, and even including manufacturing portions of the conduit sections of varying diameter, all will result in the maximum mixing and uniformity of the fluid on injection into the clarification zone.

Grinding of Raw Fluid:

As outlined it may be desired to grind the raw fluid to break up the solids that might be suspended therein into a more standard-sized particle. Numerous approaches to grinding the fluid will be understood and are outlined elsewhere herein. These might include the placement of a grinding pump inside of the settling tank, or alternatively a grinding pump might even be used on the inlet to the settling tank such that the raw fluid is grounded as it is introduced into the settling tank. One or more grinding pumps might be used. All such approaches to this will be understood to be contemplated the scope of the present invention. In addition, other approaches than the use of a grinding pump might be used to similarly break up or comminute the suspended solids in the raw fluid.

The system embodiment shown in FIG. 2, and the method embodiment shown in FIG. 5 include a grinding pump and a grinding step, which would result in the grinding of the raw fluid within the settling tank. Again as will be understood by those skilled in the art, various types of grinding or shattering actions or activities to be undertaken to break up the suspended solids within the fluid and provide them in a more uniform suspension in the raw fluid so that they can more easily be settled about from the clarified fluid in accordance with the exercise of the system and method herein.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

In addition, it will be apparent to those of skill in the art that by routine modification the present invention can be optimized for use in a wide range of conditions and application. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept.

The invention claimed is:

1. A system for the clarification of raw fluid containing suspended solids by separation of the raw fluid into clarified fluid and settled solids, said system comprising:
   a) a vertically oriented unpressurized settling tank capable of receiving raw fluid from a raw fluid source, said settling tank having a top and a bottom, and a sludge discharge located at the bottom thereof through which settled solids from raw fluid settled therein can be removed from the settling tank;
   b) a vertically oriented pressurizeable clarification vessel having a top and a bottom, the clarification vessel having:
      a raw fluid injection inlet located along a side of the vessel between the top and the bottom;
      a clarified fluid discharge at the top of the vessel;
      a settled solids discharge at the bottom of the vessel; and c) a conduit having an intake end and an injection end, the intake end being connected to a settling discharge of the settling tank near the top of the settling tank and the injection end being connected to the raw fluid injection inlet;

d) a controllable raw fluid injection valve within the conduit, through which raw fluid can be injected into the clarification vessel from the settling tank, the portion of the conduit between the settling discharge and the raw fluid injection valve being the non-pressurized intake portion and the portion of the conduit between the raw fluid injection valve and the raw fluid injection inlet being the pressurized injection portion;

e) a controllable pressure control fluid discharge valve connected to the clarified fluid discharge, through which clarified fluid can be discharged;

f) a controllable pressure control solids discharge valve connected to the settled solids discharge, through which settled suspended solids can be discharged; and g) injection means to inject raw fluid from the settling tank through the raw fluid injection valve;

wherein during operation of the system:

the clarification vessel will be filled with raw fluid by the injection thereof from the settling tank through the conduit;

suspended solids will settle to the bottom of the clarification vessel, being settled solids for discharge through the solids discharge valve to a non-pressurized solids downstream;

clarified fluid from which suspended solids have settled will be discharged from the fluid discharge valve to a non-pressurized fluid downstream;

and wherein the selected operating pressure of the clarification zone defined by the clarification vessel between the raw fluid injection valve, the fluid discharge valve and the solids discharge valve will be maintained during the injection of raw fluid or the discharge of clarified fluid or settled solids therefrom.

2. The system of claim 1 wherein the operating pressure of the clarification zone is maintained by the cooperation of the raw fluid injection valve, the fluid discharge valve and the solids discharge valve during the injection of raw fluid or the discharge of clarified fluid or settled solids therefrom.

3. The system of claim 1 wherein on actuation of the fluid discharge valve to discharge clarified fluid from the clarification vessel, the raw fluid injection valve is actuated to inject sufficient volume of raw fluid into the clarification vessel to maintain operating pressure.

4. The system of claim 1 wherein on actuation of the solids discharge valve to discharge settled solids from the bottom of the clarification vessel, the raw fluid injection valve is actuated to inject sufficient volume of raw fluid into the clarification vessel to maintain operating pressure.

5. The system of claim 1 wherein the injection means, the raw fluid injection valve, the fluid discharge valve and the solids discharge valve are manually controllable by an operator.

6. The system of claim 1 wherein the control of the injection means, the raw fluid injection valve, the fluid discharge valve and the solids discharge valve is automated.

7. The system of claim 6 further comprising a programmable valve controller capable of individually controlling the actuation of the injection means as well as the opening or closing of each of the raw fluid injection valve, the discharge valve and the sludge valve, to maintain the constant operating pressure in the clarification vessel during operation.

8. The system of claim 1 wherein the system is operated in a continuous feeding and discharge mode, whereby raw fluid is injected into the clarification vessel at the same time as clarified fluid is discharged therefrom.

9. The system of claim 1 wherein the injection portion of the conduit contains interior fighting to mix raw fluid passing therethrough.

10. The system of claim 1 wherein the injection portion of the conduit consists of a plurality of tubular sections of varying diameters, which will exert a venturi mixing effect upon raw fluid passing therethrough.

11. The system of claim 10 wherein the plurality of tubular sections of varying diameters contain interior fighting.

12. The system of claim 1 wherein the injection portion of the conduit is horizontal in relation to the vertically positioned clarification vessel.

13. The system of claim 1 further comprising at least one injector in the injection portion of the conduit, by which chemical agents can be injected into raw fluid before entry into the clarification vessel.

14. The system of claim 1 wherein the pressure which is maintained in operation in the clarification vessel is in the range of 10 to 20 pounds per square inch.

15. The system of claim 1 further comprising an overflow line connected from near the top of the settling tank back to the raw fluid source.

16. The system of claim 1 wherein the injection means is a pump.

17. The system of claim 1 further comprising at least one grinding pump for grinding the suspended solids within the raw fluid.

18. The system of claim 17 wherein the at least one grinding pump is located within the settling tank.

19. The system of claim 17 wherein the at least one grinding pump is located before the settling tank, connected to the raw fluid source before entry of the raw fluid into the settling tank.

20. A method of clarifying raw fluid containing suspended solids by separation of the raw fluid into clarified fluid and settled solids, said method comprising:

a) providing a fluid clarification system comprising:

a vertically oriented unpressurized settling tank capable of receiving raw fluid for clarification from a raw fluid source, said settling tank having a top and a bottom, and a sludge discharge located at the bottom thereof through which settled solids from raw fluid settled therein can be removed from the settling tank;

a vertically oriented pressurizeable clarification vessel having a top and a bottom, the clarification vessel having:

a raw fluid injection inlet located along a side of the vessel between the top and the bottom;

a clarified fluid discharge at the top of the vessel;

a settled solids discharge at the bottom of the vessel; and a conduit having an intake end and an injection end, the intake end being connected to a settling discharge of the settling tank near the top of the settling tank and the injection end being connected to the raw fluid injection inlet;

a controllable raw fluid injection valve within the conduit, through which raw fluid can be injected into the clarification vessel from the settling tank, the portion of the conduit between the settling discharge and the raw fluid injection valve being the non-pressurized intake portion and the portion of the conduit between the raw fluid injection valve and the raw fluid injection inlet being the pressurized injection portion;

a controllable pressure control fluid discharge valve connected to the clarified fluid discharge, through which clarified fluid can be discharged;

a controllable pressure control solids discharge valve connected to the settled solids discharge, through which settled suspended solids can be discharged; and injection means to inject raw fluid from the settling tank through the raw fluid injection valve to operating pressure in the clarification vessel;

b) filling the clarification vessel with raw fluid by actuating the injection means to inject raw fluid into said vessel from the settling tank through the conduit, until the desired operating pressure in the clarification vessel is reached;

c) following settling of the settled solids from the raw fluid, injecting additional raw fluid into the clarification vessel through the raw fluid injection valve and the conduit while maintaining the desired operating pressure in the clarification vessel by:

discharging clarified fluid to a non-pressurized fluid downstream by actuating the fluid discharge valve; and discharging settled solids to a non-pressurized solids downstream by actuating the fluid discharge valve.

21. The method of claim 20 wherein the operating pressure of the clarification vessel is maintained by the cooperation of the raw fluid injection valve, the fluid discharge valve and the solids discharge valve during the injection of raw fluid or the discharge of clarified fluid or settled solids therefrom.

22. The method of claim 20 wherein on actuation of the fluid discharge valve to discharge clarified fluid from the clarification vessel, the raw fluid injection valve is actuated to inject sufficient volume of raw fluid into the clarification vessel to maintain operating pressure.

23. The method of claim 20 wherein on actuation of the solids discharge valve to discharge settled solids from the bottom of the clarification vessel, the raw fluid injection valve is actuated to inject sufficient volume of raw fluid into the clarification vessel to maintain operating pressure.

24. The method of claim 20 wherein the injection means, the raw fluid injection valve, the fluid discharge valve and the solids discharge valve are manually controllable by an operator.

25. The method of claim 20 wherein the control of the injection means, the raw fluid injection valve, the fluid discharge valve and the solids discharge valve is automated.

26. The method of claim 25 further comprising a programmable valve controller capable of individually controlling the actuation of the injection means as well as the opening or closing of each of the raw fluid injection valve, the discharge valve and the sludge valve, to maintain the constant operating pressure in the clarification vessel during operation.

27. The method of claim 20 wherein the system is operated in a continuous feeding and discharge mode, whereby raw fluid is injected into the clarification vessel at the same time as clarified fluid is discharged therefrom.

28. The method of claim 20 wherein the injection portion of the conduit contains interior flighting to mix raw fluid passing therethrough.

29. The method of claim 20 wherein the injection portion of the conduit consists of a plurality of tubular sections of varying diameters, which will exert a venturi mixing effect upon raw fluid passing therethrough.

30. The method of claim 29 wherein the plurality of tubular sections of varying diameters contain interior fighting.

31. The method of claim 20 wherein the injection portion of the conduit is horizontal in relation to the vertically positioned clarification vessel.

32. The method of claim 20 further comprising injecting at least one chemical agent into raw fluid within the injection portion of the conduit via at least one injector.

33. The method of claim 20 wherein the pressure which is maintained in operation in the clarification vessel is in the range of 10 to 20 pounds per square inch.

34. The method of claim 20 further comprising grinding the raw fluid in a grinding pump before entry into the settling tank, to grind the suspended solids therein.

35. The method of claim 20 further comprising grinding the raw fluid in a grinding pump within the settling tank, to grind the suspended solids therein.

\* \* \* \* \*